United States Patent
Laugeois et al.

(10) Patent No.: US 7,095,818 B2
(45) Date of Patent: Aug. 22, 2006

(54) DATA TRANSMISSION PROCESS WITH AUTO-SYNCHRONIZED CORRECTING CODE, AUTO-SYNCHRONIZED CODER AND DECODER, CORRESPONDING TRANSMITTER AND RECEIVER

(76) Inventors: Marc Laugeois, 94Bis, rue Abbe Grégoire, 38000 Grenoble (FR); Didier Lattard, Les Rithons 38680, Rencurel (FR); Jean-Remi Savel, APPT.72 Le Charmeyran, 38700 Corenc (FR); Bouvier des Noes Mathieu, 3 Rue Lachmann, 38000 Grenoble (FR)

( * ) Notice: Subject to any disclaimer, the term of this patent is extended or adjusted under 35 U.S.C. 154(b) by 694 days.

(21) Appl. No.: 09/878,343

(22) Filed: Jun. 12, 2001

(65) Prior Publication Data
US 2002/0004405 A1    Jan. 10, 2002

(30) Foreign Application Priority Data
Jun. 14, 2000 (FR) .................................. 00 07563

(51) Int. Cl.
H04L 7/00 (2006.01)
(52) U.S. Cl. ............... 375/365; 375/354; 375/356; 375/359; 370/509; 370/512; 455/502
(58) Field of Classification Search ................ 375/242, 375/354, 357, 365, 356, 359; 714/12, 752, 714/759; 370/252, 350, 509, 512; 455/502
See application file for complete search history.

(56) References Cited

U.S. PATENT DOCUMENTS

| | | | |
|---|---|---|---|
| 4,811,361 A | 3/1989 | Bacou et al. ............... 375/242 |
| 5,692,021 A * | 11/1997 | Walker ........................ 375/354 |
| 5,854,840 A | 12/1998 | Cannella, Jr. ............... 380/268 |
| 5,983,383 A | 11/1999 | Wolf ........................... 714/755 |
| 5,987,024 A * | 11/1999 | Duch et al. .................. 370/350 |
| 6,081,650 A * | 6/2000 | Lyons et al. .................. 386/95 |
| 6,650,624 B1 * | 11/2003 | Quigley et al. ............. 370/252 |
| 6,980,616 B1 * | 12/2005 | Nakano et al. ............. 375/364 |

FOREIGN PATENT DOCUMENTS

| | | |
|---|---|---|
| EP | 0 758 168 A1 | 2/1997 |
| EP | 0 847 169 A2 | 6/1998 |

* cited by examiner

*Primary Examiner*—Chieh M. Fan
*Assistant Examiner*—Ted M. Wang
(74) *Attorney, Agent, or Firm*—Berkeley Law and Technology Group, LLC

(57) ABSTRACT

A data transmission process with auto-synchronised correcting code, auto-synchronised coder and decoder, corresponding transmitter and receiver.

According to the invention, synchronisation management signals (HS, SS, ID) are formed and, under the control of these signals, a header is inserted before a data group and after it a correcting code. At receive end, these synchronisation management signals are reconstituted, the presence of a header is detected and any erroneous symbols are corrected.

The invention also provides for an auto-synchronised coder and a decoder and for a transmitter and a receiver using them.

5 Claims, 5 Drawing Sheets

DATA TRANSMISSION PROCESS WITH AUTO-SYNCHRONIZED CORRECTING CODE, AUTO-SYNCHRONIZED CODER AND DECODER, CORRESPONDING TRANSMITTER AND RECEIVER

TECHNICAL FIELD

The object of the present invention is a data transmission process with auto-synchronised correcting code, an auto-synchronised coder and decoder, and a corresponding transmitter and receiver.

The invention finds an application in telecommunications.

PRIOR ART

When a digital signal is disturbed during its propagation, it is useful to provide a redundancy in the transmitted message so as to correct the errors made. This redundancy may be obtained by an error correcting code. Introducing such a code requires the data to be framed, this framing being provided in a communication protocol. It is not generally executed in what is called the physical layer (which includes baseband modulation devices) but in a particular link layer.

The appended FIGS. 1 to 5 show this technique. They correspond to information symbols constituted by bytes of m bits, where m is an integer dependent on the code selected, for example a power of 2, like 8 (in which case the byte is an octet).

In FIG. 1, first of all, a coded frame format can be seen, at the output from a coding circuit. The frame shown includes a header 10 (which is a frame synchronisation word) constituted by n symbols each of m bits, a first group 12 of K symbols of m bits and lastly a second group 14 of R symbols of m bits. This second group 14 is the correcting code associated with the first group 12. Only the first group 12 shows the information to be transmitted, the second 14, constituting a redundancy. The numbers K and R are characteristic of the correcting code used. For example, for a Reed-Solomon code, the total length of the message in bytes (i.e. K+R) and the number of coding bytes (R) is shown.

FIG. 2 shows a coding circuit (or coder) allowing such a frame to be constituted. As shown, this circuit 20 includes a serial-to-parallel converter 22, a coder 24 and a parallel-to-serial converter 26 (the converters 22 and 26 are optional). A synchronisation signal S controls the circuits 22 and 24. The data to be coded D is introduced into the converter 22 and the coded data Dc is extracted from the converter 26.

FIG. 3 shows the corresponding decoding circuit (or decoder). As shown, this circuit 30 includes a serial-to-parallel converter 32, a decoder 34 and a parallel-to-serial converter 36. The synchronisation signal S controls the circuits 32 and 34. The coded data Dc is applied to the converter 32 and the decoded data D is extracted from the converter 36.

FIG. 4 shows interfacing means between the coding means and the modulation means. This interfacing 40 includes a buffer memory 42 containing the data to be coded, a coder 44, a buffer memory 46, for example of the FIFO (First In First Out) type, and a modulation interface 48 the output 49 of which is connected to the modulation means not shown. Synchronisation of the coder 44 is provided by the synchronisation signal S.

FIG. 5 shows the corresponding demodulation-decoding interfacing. As shown, this interfacing 50 includes an input 51 connected to the demodulation means not shown, a circuit 52 for separating the frames and interfacing with the demodulation means, a buffer memory 54, for example of the FIFO type, a decoder 56, and a data buffer memory 58. The decoder is controlled by the synchronisation signal S.

In the circuits in FIGS. 4 and 5, the FIFO memories 46 and 54 are used to adapt the data rates between the coder and the modulation or between the demodulation and the decoder.

In short, in this prior art, the use of a correcting code requires special means. If a connection is used without such means and if it is desired, in order to improve transmission performance, to benefit from the correcting code, it will be essential to put in management circuits.

The precise purpose of the present invention is to overcome this drawback.

DISCLOSURE OF THE INVENTION

To this end, the invention proposes a process wherein the correcting code is auto-synchronised and does not require any addition of management circuits. Everything occurs in the physical layer (coding and modulation or demodulation and decoding). The upper layers of the protocol no longer have to format the frames since the data to be transmitted is automatically associated with a header and with a correcting code. The user does not have access to the packet constituted and does not therefore have to manage the synchronisation problems linked to the presence of the code. On the decoder side, this effects a header search in the bit stream provided by the demodulation stage. A synchronisation algorithm allows reliable auto-synchronisation. No external interfacing is necessary between the modulation (or demodulation) and the coding (decoding). Adding a correcting code to a connection which does not have one initially is therefore a totally transparent operation for the user. The initial hardware configuration does not need to be reviewed. The coder and decoder circuit are wired directly before the baseband modulation circuit and after the demodulation circuit respectively.

To be exact, the object of the invention is a data transmission process with auto-synchronised correcting code, characterised in that:

a) at transmission:

i) the data to be transmitted being constituted by bits having a timing defined by a clock signal (H), synchronisation management signals are formed including:

a symbol clock signal (HS) m times less fast than the clock signal (H) where m is an integer, m bits constituting an information symbol (S), a synchronisation signal (SS) designating the first symbol of the packet, a data acquisition interruption signal (ID) intervening every K symbols, where K is a pre-set integer, ii) under the control of the data acquisition interruption signal (ID), before a first group of K symbols is inserted a header and, after said first group, is inserted a second group of R symbols constituting a correcting code corresponding to the K symbols of the first group, R being a pre-set integer dependent on the correcting code type used, the first and second groups of (R+K) symbols forming a packet, and the header a header specific to this packet, iii) each packet is modulated and transmitted in an appropriate way with its header, b) at the receive end:

i) the signal received is demodulated, and the bit clock signal (H) is extracted from it, ii) from the demodulated signal, a header search process is implemented in the demodulated signals and, when a header is detected, the header search process is inhibited, and the synchronisation control (SS) is generated designating the first packet signal;

iii) under the control of the symbol clock (HS) and symbol synchronisation (SS) signals, the received packet is processed, so as to correct any erroneous symbols of the first group by means of the correcting code of the second group, and the header search process is reactivated after each packet processing, iv) from the corrected symbols the transmitted data is retrieved.

In a particular embodiment, a) at transmission, modulation is effected by spread spectrum by means of pseudo-random sequences, b) at the receive end, demodulation is effected by correlation with the pseudo-random sequences used at transmission.

Another object of the present invention is an auto-synchronised coder for the implementation of the process which has just been defined. This coder is characterised in that it includes:

i) means for forming synchronisation management signals including:

a symbol clock signal (HS) m times less fast than a clock signal (H) timing the data bits, where m is an integer, m bits constituting an information symbol (S), a synchronisation signal (SS) designating the first symbol of the packet, a data acquisition interruption signal (ID) intervening every K symbols, where K is a pre-set integer, ii) means for inserting, under the control of the acquisition interruption signal (ID), before a first group of K symbols a packet header and, after said first group, a second group of R symbols constituting a correcting code assigned to the K symbols of the first group, R being a pre-set integer dependent on the correcting code type used, the first and second groups of (R+K) symbols forming a packet, and the header a header specific to this packet.

Another object of this invention is an auto-synchronised decoder for implementing the process which has just been defined. This coder is characterised in that it includes:

i) means for constituting, from a data packet, a clock signal (H), a symbol clock signal (HS) and a symbol synchronisation signal (SS);

ii) means for implementing a header search process in the demodulated packet and, when a header is detected, for inhibiting the header search and for, under the control of the symbol clock (HS) signals and the synchronisation signal (SS) designating the first packet symbol, processing the packet received and for correcting any erroneous symbols of the first group by means of the correcting code of the second group and, for reactivating the header search process after each packet processing.

Yet another object of the invention is a transmitter including a transmission module able to modulate the data and to spread the spectrum of this data by a pseudo-random sequence, this transmitter being characterised in that it additionally includes, before said transmission module, an auto-synchronised coder.

A final object of this invention is a receiver including a receive module able to demodulate the data and to despread the spectrum of this data by a pseudo-random sequence, this receiver being characterised in that it additionally includes, after said receive module, an auto-synchronised decoder.

All known correcting codes may be used in the invention, and in particular the so-called Reed-Solomon code.

DESCRIPTION OF PARTICULAR EMBODIMENTS

Figure 1:
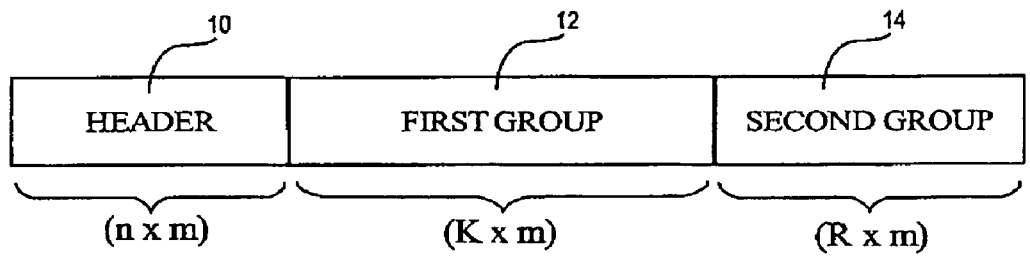
FIG. 1, already described, shows a data packet including K information symbols of m bits each, R correcting code symbols of m bits each, a packet header.
Figure 2:
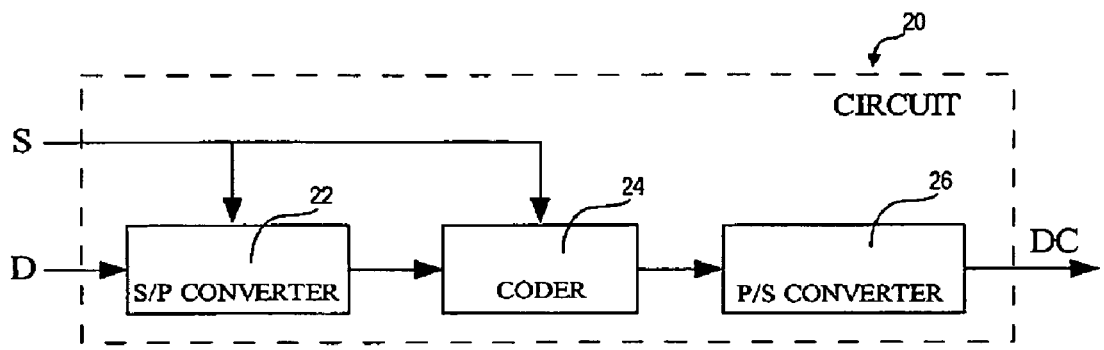
FIG. 2, already described, shows a coding circuit according to the prior art.
Figure 3:
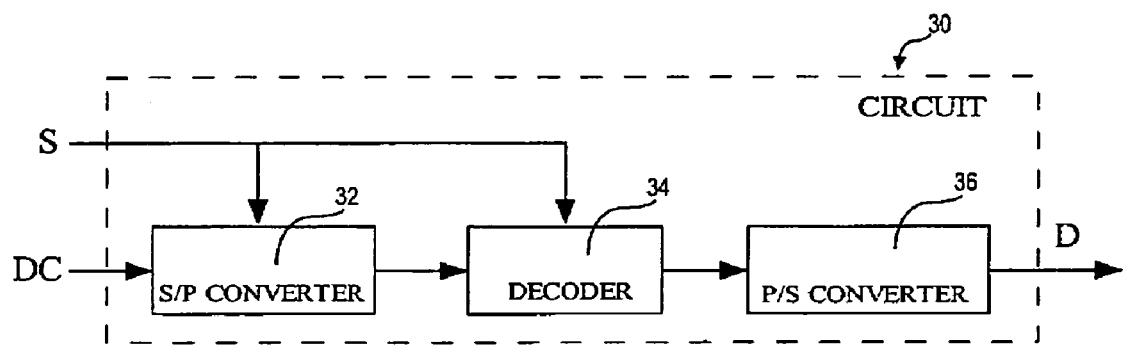
FIG. 3, already described, shows an decoding circuit according to the prior art.
Figure 4:
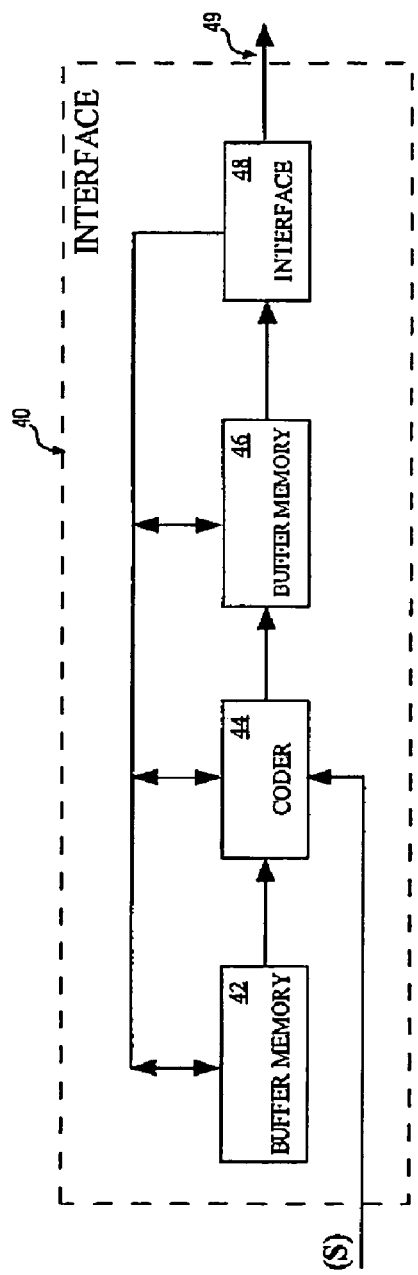
FIG. 4, already described, shows an already known interfacing between the coding means and the modulation means.
Figure 5:
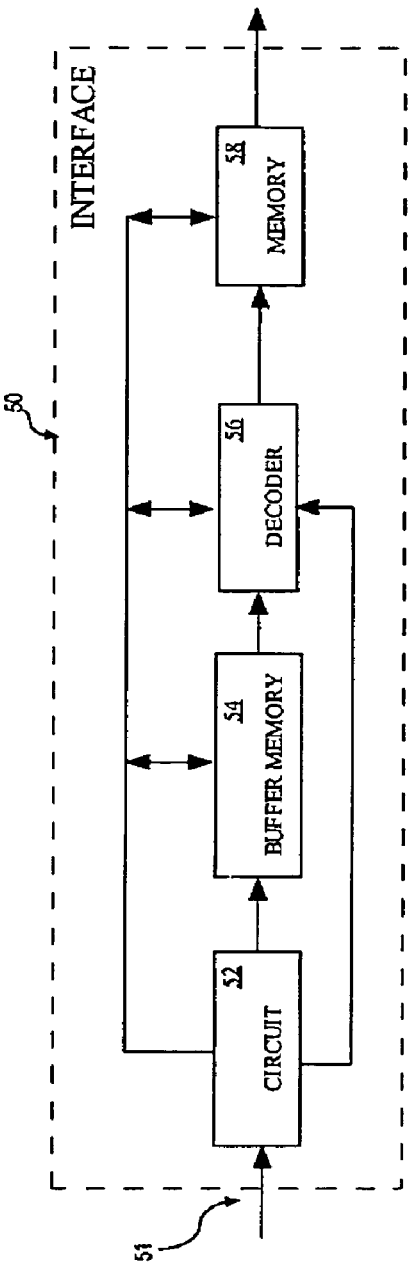
FIG. 5, already described, shows an already known interfacing between the demodulation means and the correcting code processing means.
Figure 6:
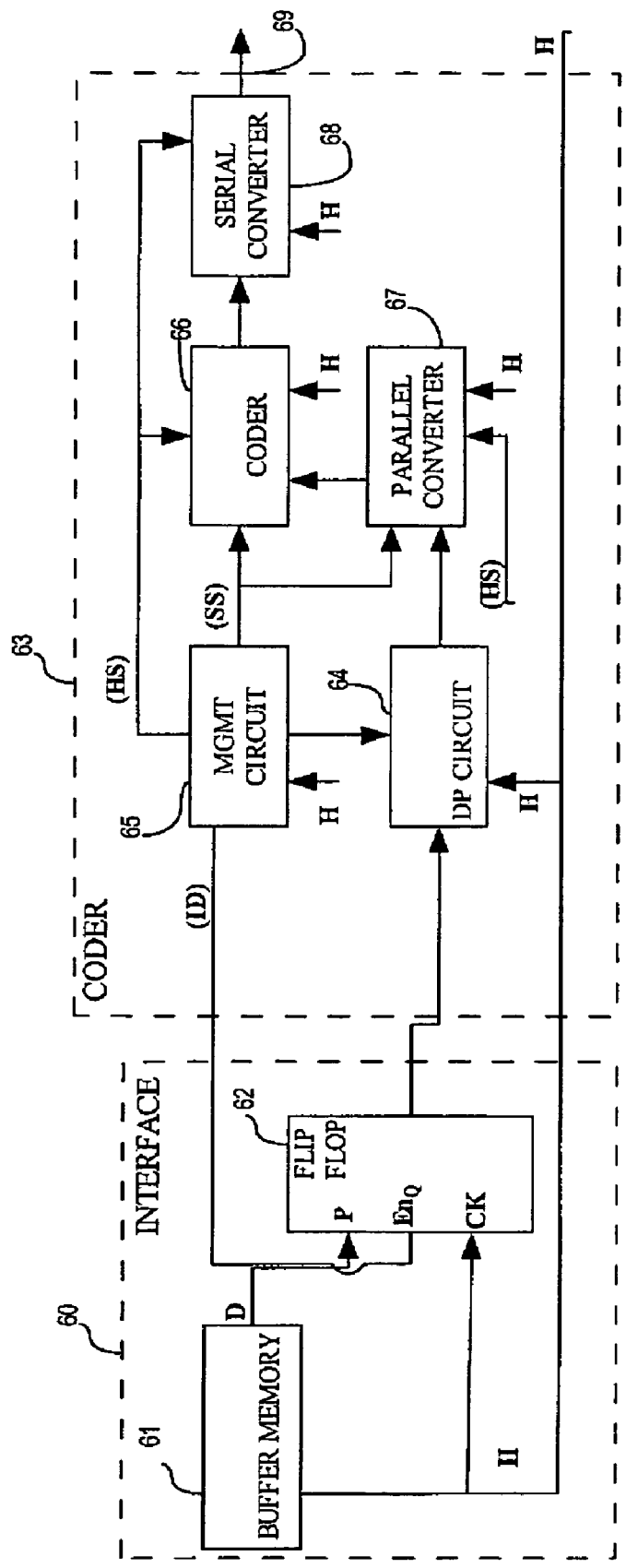
FIG. 6 shows a particular embodiment of an auto-synchronised coder according to the invention.

FIG. 6 shows the architecture of an auto-synchronised coder according to the invention with an upstream interface. The upstream interface 60 includes a buffer memory 61 containing data to be transmitted D and a flip-flop 62 with three inputs P, En and CK, and an output Q. The coder 63 itself includes a data processing circuit 64 the function of which is to insert a header in the data stream, an automatic synchronisation management circuit 65, this circuit delivering three signals: a data acquisition interruption signal ID, a symbol clock signal HS, m times less fast than the clock signal H and a symbol synchronisation signal SS locating the start of each symbol. The circuit 63 further includes a coder 66 operating on bytes (m bits, with, for example, m=8 if it is a question of octets). This coder receives the symbols S from a serial-to-parallel converter 67 (optional) and the symbol clock HS. The coder 66 delivers a data stream organised into symbols with a header, information symbols and redundancy symbols defined by the correcting code used. The circuit 63 may further include a parallel-to-serial converter 68 the output 69 of which delivers the data which will then be processed by the modulation means not shown.

The input En of the flip-flop 62 allows the data stream D to be interrupted by means of the signal ID delivered by the circuit 65. This interruption allows the header to be inserted and the coding symbols to be added. The serial-to-parallel converter 67 allows m bit symbols to be constituted from the data (if m=1, this converter serves no purpose).

The clock H timing the bits is provided by the modulation stage.

Figure 7:
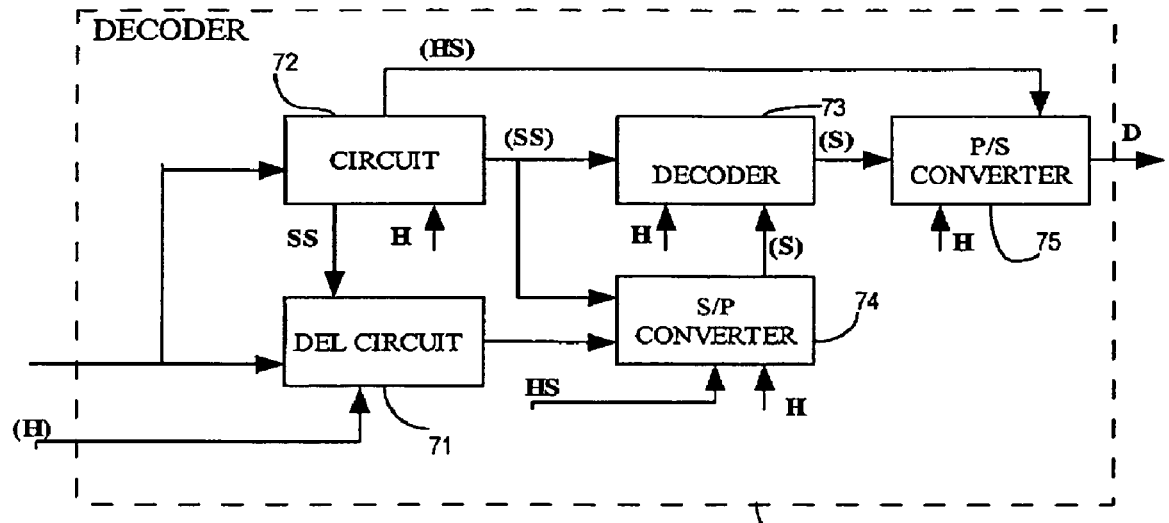
FIG. 7 shows a particular embodiment of an auto-synchronised decoder according to the invention.

FIG. 7 shows the architecture of an auto-synchronised decoder according to the invention. As shown, this decoder 70 includes a header deletion circuit 71, receiving the bit stream coming from the modulation means not shown, a circuit 72 implementing a header detection algorithm and receiving the bit stream coming from the demodulation means and delivering a symbol clock signal HS and a synchronisation signal SS designating the first packet symbol. The circuit 70 further includes a serial-to-parallel converter 74 (optional) receiving the symbol clock signal HS, a decoder 73 correcting any erroneous symbols and delivering corrected information symbols, and lastly a parallel-to-serial converter 75 delivering the finally transmitted data. The bit clock H is provided by the demodulation means.

Figure 8:
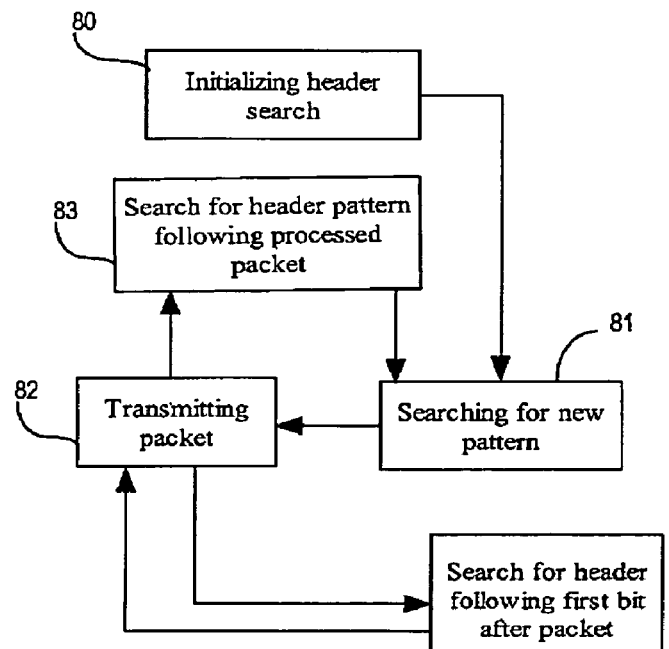
FIG. 8 is a state diagram relating to the header search process.

FIG. 8 is a state diagram showing the header search algorithm in the data stream. The blocks shown each correspond to a phase with the following correspondence:

block 80: Phase 0 (header search initialisation), block 81: Phase 1 (search for a new pattern in a time less than or equal to a header time), block 82: Phase 2 (transmission of a packet; inhibition of the header search during a packet), block 83: Phase 3 (search for a header pattern following the processed packet), block 84: Phase 4 (header search directly following the first bit after the packet).

The operation of the process is then as follows. At the start of the process, the inhibition signal is inactive. This means that header search phase is operative (phase 0).

The bit stream provided by the demodulation stage is correlated by the pseudo-random binary sequence of the header. If the correlation exceeds a certain threshold, a flag is activated (phase 0→phase 1). When a sequence of patterns in the bit stream appears as a header in a time less than or equal to the header time, the flag will be activated several times (m×n×H) (phase 1). Synchronisation is then effected on the last pattern (i.e. the last pattern activating the flag) (transfer from phase 1 to phase 2).

The header search is then inhibited during a packet transmission time (correcting code included). The flag cannot be activated (phase 2). At the end of the packet, the inhibition signal returns to the. inactive state, and a new header search begins (transfer from phase 2 to phase 3 or 4).

If the flag is activated from the first bit following the packet (phase 4), then synchronisation takes place on this pattern and the header search inhibition is again activated. In the opposite case, the search is effected as at the algorithm start (phase 3). Transfer from phase 3 to phase 1 is effected in exactly the same way as the transfer from phase 0 to phase 1.

A header sequence may be assumed to be present if the correlator several times exceeds the threshold with a time between two overshoots less than or equal to the header time. For this reason, a header time window is open (phase 1). If no overshoot has occurred during this time, the system is synchronised (transfer from phase 1 to phase 2). If an overshoot has occurred, the window is again initialised (you stay in phase 1).

During continuous transmission, a "quality assurance counter" may be added. It demonstrates the reliability of the synchronisation. Its operation is as follows: when a header is detected immediately after the inhibition signal, the counter is incremented. The threshold on the header search correlator may then be reduced.

In the opposite case, it is decreased. This means that the previously detected header was not reliable, therefore that the threshold was placed too low. The threshold must therefore be increased.

Figure 9:
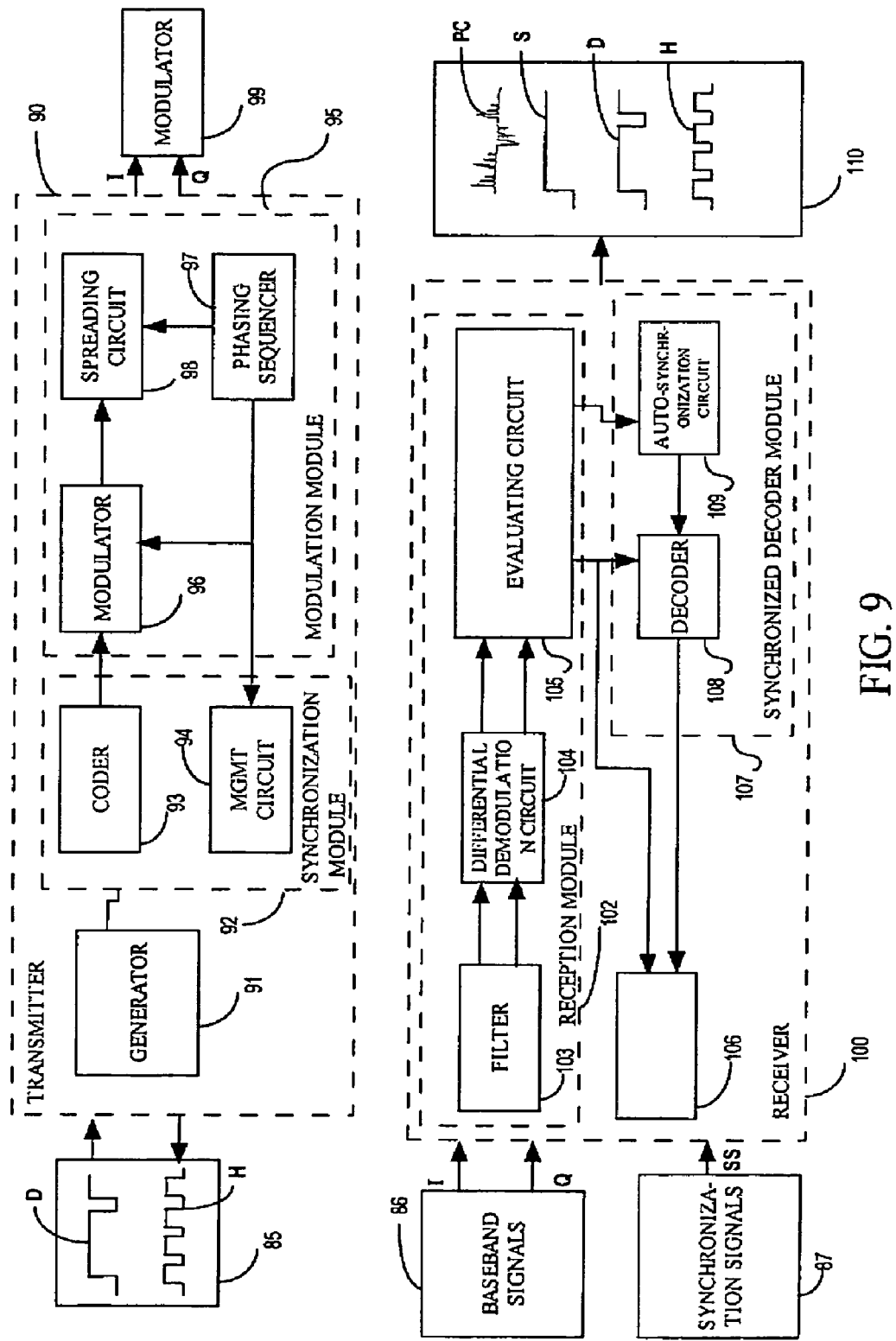
FIG. 9 shows an embodiment example of a circuit made by the Applicant, working in transmission and/or in reception, with a Reed-Solomon code and a modulation by direct sequence spread spectrum.

FIG. 9, lastly, shows an example of an implementation of the invention in the case of a Reed-Solomon coder defined by K=25 and R=6 (it is therefore a code (31, 35), with m=8 (the symbols are therefore octets). The modulation uses the direct sequence spread spectrum technique. The circuit 90 corresponds to a transmitter and the circuit 100 to a receiver. The whole corresponds to the circuit which the Applicant denotes by "ICARE".

The transmitter 90 receives the data symbolised by the signal D and includes a data generator 91, a correcting code synchronisation module 92 including a Reed-Solomon coder 93 and a synchronisation management circuit 94. It further includes a modulation module 95 including a modulator 96 of the DQPSK (Differential Quaternary Phase Shift Keying) type, a block 97 phasing the pseudo-random sequence with the datum and a circuit 98 for spreading the data modulated by 96 by the sequence produced by 97.

This transmitter 90 produces baseband signals I and Q respectively in phase and in phase opposition with a carrier and which will come to modulate a carrier RF symbolised by the block 99. The transmitter 90 also produces clock signals H symbolised in the block 85.

The receiver 100 receives the baseband signals I and Q symbolised by the block 86 and synchronisation signals symbolised by the block 87. It includes a reception module 102 including a filter 103 adapted to the pseudo-random sequence used at transmission, a differential demodulation (DQPSK) circuit 104, a circuit 105 for evaluating the transmission channel, detecting the correlation peaks (PC), for retrieving data D, for forming a synchronisation signal (S) and a clock (H), all signals shown diagrammatically in the block 110. The receiver 100 further includes an auto-synchronised decoder module 107, including a Reed-Solomon decoder 108 and a header detection and auto-synchronisation circuit 109. In the embodiment shown, the module is preceded by a data tester generator 106.

In the transmitter, the module 92 corresponds to the circuit 63 in FIG. 6 and, in the receiver, the module 107 corresponds to the circuit 70 in FIG. 7. The other means are conventional in direct sequence spread spectrum technology and are well known to the man skilled in the art.

What is claimed is:

1. A data transmission process with auto-synchronized correcting code, comprising:

defining a timing of bits of the data, to be transmitted, by a clock signal and forming synchronization management signals comprising:

a symbol clock signal m number of times less fast than the clock signal, where m is an integer, and m bits constituting an information symbol, a symbol synchronization signal capable of designating the first symbol of a packet, and a data acquisition interruption signal intervening every K number of symbols, where K is a pre-set integer;

inserting a header before a first group of K symbols and inserting a second group of R symbols after said first group, the second group of R symbols comprising a correcting code corresponding to the K symbols of the first group, R being a pre-set integer dependent on a correcting code type used, the first and second groups of (R+K) symbols forming a packet, and the header being a header specific to this packet, under control of the data acquisition interrupting signal; and modulating and transmitting each packet with its header;

demodulating the signal received and extracting the clock signal;

implementing a header search process in the demodulated signal and, when the header is detected, inhibiting the header search process and generating a symbol synchronization symbol;

processing the received packet so as to correct any erroneous symbols of the first group by the correcting code of the second group and reactivating the header search process after each packet processing, under the control of the symbol clock and symbol synchronization signals; and retrieving, from the corrected symbols, the transmitted data.

2. The process according to claim 1, wherein:

at transmission, said modulating is effected by spread spectrum by means of pseudo-random sequences; and correlating with the pseudo-random sequences at transmission.

3. The process according to claim 1, wherein the correcting code is a Reed-Solomon type code.

4. An auto-synchronized coder, comprising:

means for forming synchronization management signals, wherein the synchronization management signals comprise:

a symbol clock signal m times less fast as a clock signal timing the data bits, where m is an integer, and m bits constitute an information symbol, a symbol synchronization signal locating the start of each symbol, a data acquisition interruption signal intervening every K number of symbols, where K is a pre-set integer; and means for inserting, under control of the acquisition interruption signal, a packet header before a first group of K symbols, and a second group of R symbols after said first group, the second group of R symbols constituting a correcting code assigned to the K symbols of the first group, R being a pre-set integer based at least in part upon the correcting code type used, the first and second group of (R+K) symbols forming a packet, and the header being a header specific to this packet.

5. A transmitter, comprising:

a transmission module configured to modulate the data and to spread the spectrum of the data by a pseudo-random sequence; and an auto-synchronized coda, before said transmission module, comprising:

means for forming synchronization management signals, the synchronization management signals comprising:

a symbol clock signal m times less fast than a clock signal timing the data bits, where m is an integer, m bits constituting an information symbol, a symbol synchronization signal locating the start of each symbol, and a data acquisition interruption signal intervening every K number of symbols, where K is a pre-set integer;

means for inserting, under control of the acquisition interruption signal, a packet header before a first group of K symbols and a second group of R symbols after said first group, the second group of R symbols constituting a correcting code assigned to the K symbols of the first group, R being a pre-sent integer dependent on the correcting code type used, the first and second group of(R+K) symbols forming a packet, and the header being a header specific to this packet.

* * * * *